3,216,968
FLAME RESISTANT COMPOSITIONS COMPRISING ORGANIC POLYMERS MIXED WITH QUATERNARY AMMONIUM HEXAFLUOROPHOSPHATE COMPOUNDS
Stuart B. Monroe, 2508 McCawber Drive, Limestone Gardens, Wilmington, Del.
No Drawing. Filed Feb. 26, 1964, Ser. No. 347,371
9 Claims. (Cl. 260—45.9)

This invention relates to improving the flame resistance of solid polymers without major impairment of the physical and mechanical properties of the polymer, and to the improved flame-resistant compositions produced thereby.

It has been proposed heretofore to impart flame resistance to solid polymers by the incorporation of various materials therein. Flame resistance has been obtained in polyethylene, for instance, by combining with the polyethylene a solid chlorinated hydrocarbon of high chlorine content, such as chlorinated paraffin, and an inorganic flame-retardant substance such as antimony trioxide in critical proportions to each other and to the polyethylene. Such compositions are described by Happoldt, Jr., in U.S. Patent No. 2,480,298. Other flame-resistant compositions are disclosed by Rugar in U.S. Patent No. 2,590,211 and by Bierly in U.S. Patent No. 2,669,521.

These prior art compositions are generally acceptable from the standpoint of flame resistance but have substantially impaired mechanical properties due to the inclusion of the flame-retardant materials. Such flame-resistant polyethylenes, for example, are subject to excessive embrittlement, particularly after natural or accelerated aging. In addition, the high amount of chlorinated paraffin or other organic chlorinated material which is necessary to produce a good degree of flame resistance acts as a viscosity depressant and adversely affects the resistance of the polyethylene composition to deformation under load at elevated temperatures. The organic flame-retardant materials most frequently used both reduce the viscosity of the composition and increase the tendency to become brittle. Another disadvantage of these prior art compositions is that the inclusion of the inorganic compound causes a significant increase of the density of the polymer and also renders it opaque.

It has been proposed also to incorporate additional nonchlorinated elastomers, sometimes with reduced proportions of the flame-retardant materials, in such flame-resistant polyethylene compositions in an effort to improve these undesirable aging characteristics. Such elastomer materials, of which butyl rubber and polyisobutylene are examples, are themselves flammable, and the flame resistance of the composition is undesirably affected by their inclusion. Addition of nonchlorinated elastomers may be effective in retarding increased embrittlement resulting from natural or accelerated aging, but it does not permit any material reduction in the amount of chlorinated paraffin which is necessary if a satisfactory level of flame resistance is to be obtained.

It has also been proposed to substitute a highly branched chlorine-containing elastomer such as neoprene for a portion of the chlorinated paraffin in such flame-resistant polyethylene compositions in order to improve resistance to embrittlement and deformation under load at elevated temperatures. While these chlorine-containing elastomers do improve the flexibility of the composition, they do not permit any material reduction in the total amount of chlorinated material and antimony trioxide necessary if a satisfactory level of flame resistance is to be obtained. Moreover, such compositions show poor resistance to heat aging.

In work leading to the present invention, it has been found possible to produce flame resistant compositions with a decreased amount of the halogenated hydrocarbon and inorganic metal containing flame retardant by incorporating therewith a propoxylated pyrophosphate. Such compositions exhibit good flame resistance and a smaller deterioration of other physical and mechanical properties than do the compositions containing only the chlorinated compound and the antimony oxide. However, these compositions still contain sizeable quantities of both the inorganic compound and the chlorinated compound and exhibit some of the shortcomings inherent in such systems.

Accordingly, it is an object of the present invention to provide a polymer composition having outstanding flame resistance with even less effect on the other properties of the base polymer.

In accordance with the present invention, flame resistant compositions are prepared which comprise a thermoplastic organic polymer and a quaternary ammonium compound having the formula

where R, $R_1$, $R_2$, and $R_3$ are selected from the group consisting of hydrogen and hydrocarbon radicals, the ammonium compound being present in such amount that the composition contains about 2 to 5% phosphorus based on the total weight of the composition. A typical compound in this class, and a preferred compound, is ammonium hexafluorophosphate—$NH_4PF_6$.

The flame retarding compounds of this invention contribute improved flame resistance to a variety of solid thermoplastic polymers that are formerly flammable. These include such diverse materials as poly(methylmethacrylate), polystyrene, polyethylene terephthalate, stereoregular polypropylene, high density polyethylene and low density polyethylene. The compounds are particularly effective in high density polyethylene and stereoregular polypropylene.

As previously discussed, most of the prior art retardants must be used in combination with an inorganic compound such as antimony oxide. Ammonium hexafluorophosphate is unique in its flame retardant action as compared to most of these prior art retardants in that it is effective when used alone. In fact, it has been found that the flame retarding characteristics of the quaternary ammonium compound are seriously impaired, or even destroyed, by the presence of the inorganic compound. This behavior is quite anomalous and no explanation thereof has been found.

The ability to effect very efficient flame retardation without the presence of the antimony compound results in several distinct quality improvements in the compositions of the invention over those of the prior art. For instance, the novel compositions of this invention are less dense than those containing the high density antimony oxide. The density is very little different from that of an unmodified polymer.

Also compositions containing the specified quaternary ammonium compound have a higher degree of transparency than those based on antimony oxide. This is a distinct aesthetic advantage and provides an opening into new markets and uses for which flame retardant polyolefins have heretofore been unsatisfactory.

The quaternary ammonium compounds employed as flame retardants in this invention also exhibit a higher degree of heat stability than do the chlorinated organic compounds used in the majority of the known flame retardant systems. In fact, the compounds are thermally stable up to at least 20° C. higher. Thus, even lacking special thermal degradation protection, compositions containing the quaterary ammonium compound can be processed at temperatures this much higher.

The quaternary ammonium compounds useful in the invention include ammonium hexafluorophosphate and derivatives thereof resulting from substitution of one or more of the ammonium hydrogen atoms. Compounds of this class include the mono-, di-, tri- and tetra-organo derivatives. Thus in the formula set forth above, R, $R_1$, $R_2$, and $R_3$ may be alkyl, aryl, alkaryl or aralkyl radicals or any combination thereof. Examples of radicals which may be represented by R, $R_1$, $R_2$ and $R_3$ are methyl, ethyl, propyl, phenyl, tolyl, benzyl, etc. Examples of organo substituted fluorophosphates are tetramethyl ammonium hexafluorophosphate, benzyl, trimethyl ammonium hexafluorophosphate, phenyl trimethyl ammonium hexafluorophosphate, etc. Since flame retardancy is a function of the concentration of phosphorus in the polymer, greater concentrations of the relatively high molecular weight organic substituted derivatives are required to produce flame retardation equivalent to that of the unsubstituted ammonium hexafluorophosphate. Such compounds find utility as additives in the process of this invention in specific instances where the deterioration of tensile strength attendant with the larger quantity of additive is not a handicap.

The quaternary ammonium compounds can be added to the polymer by any of the techniques normally employed for incorporating additives into polymers. Such methods include rolling on a mill, mixing in a Banbury mixer, plasticating and deposition from a solvent. The quaternary ammonium compounds are quite compatible with most polymers and particularly so with polyolefins and blend readily.

In the test reported below, flame retardation is determined according to the procedure set forth in ASTM test method D-635-56T. In this procedure, a sample of the material to be tested, 5 inches long by 0.5 inch wide, is clamped in a support at a 45° angle to the horizontal. A Bunsen flame is applied to the sample for 30 seconds to induce combustion and the rate or extent of combustion is then measured. A sample whose extent of burning is less than 4 inches is classified "self-extinguishing." Samples which burn farther than 4 inches are classified as "burning."

In the following examples all parts and percentages are by weight unless otherwise indicated.

EXAMPLES 1-5

High density polyethylene (RSV 3.8) compositions containing additive concentrations as listed in Table 1 were prepared by masticating on a two-roll mill. Portions of the milled material were molded on heated hydraulic presses to yield flat plaques. These plaques were then die cut into samples suitable for testing according to ASTM D-635-56T. The results of testing these samples are reported in Table 1.

Table 1

| Example | Additive | Conc., percent | Flammability rating | Extent of burning (inches) | Density |
|---|---|---|---|---|---|
| 1 | $NH_4PF_6$ | 25 | Self ext | 0.29 | 1.07 |
| 2 | $NH_4PF_6$ | 20 | do | 0.71 | 1.05 |
| 3 | $NH_4PF_6$ | 15 | do | 1.60 | 1.03 |
| 4 | {$NH_4PF_6$ / $Sb_2O_3$} | {15 / 10} | Burning | | 1.13 |
| 5 | None | | Burning | | 0.96 |

The improvement in flame resistance accomplished by the incorporation of the ammonium hexafluorophosphate and the relationship of flame resistance to concentration of additives are apparent from the data presented in Table 1. Table 1 also demonstrates the anomalous burning experienced when the ammonium hexafluorophosphate is used in combination with antimony oxide.

EXAMPLES 6-7

Using the method employed in Examples 1-5, several organic substituted ammonium hexafluorophosphates were incorporated into high density polyethylene in an amount calculated to introduce the approximate quantity of phosphorus which could be introduced by adding 25% $NH_4PF_6$ to the same polyethylene. As the data in Table 2 show, these compositions have only slightly less flame resistance than do those where the flame retardant is the unsubstituted hexafluorophosphate shown in Table 1.

Table 2

| Example | Additive | Conc., percent | Flammability rating | Extent of burning (inches) |
|---|---|---|---|---|
| 6 | Benzyl trimethyl ammonium hexafluorophosphate. | 45.3 | Self ext | 0.75 |
| 7 | Phenyl trimethyl ammonium hexafluorophosphate. | 43.1 | do | 0.75 |

EXAMPLES 8-12

Substituted and unsubstituted ammonium hexafluorophosphates were incorporated into stereoregular polypropylene in the same manner as in Examples 1-5. These samples also exhibited improved flame retarding properties as is shown by the data in Table 3.

Table 3

| Example | Additive | Conc., percent | Flammability rating | Extent of burning (inches) |
|---|---|---|---|---|
| 8 | None | | Burning | |
| 9 | $NH_4PF_6$ | 25 | Self ext | 0.11 |
| 10 | $NH_4PF_6$ | 20 | do | 0.79 |
| 11 | $NH_4PF_6$ | 15 | do | 1.20 |
| 12 | Benzyl trimethyl ammonium hexafluorophosphate. | 43.1 | do | 1.20 |

EXAMPLES 13-15

Compositions were prepared comprising 20% ammonium hexafluorophosphate based on the total weight of composition, and poly(methylmethacrylate), polystyrene and low density polyethylene. Each of these polymers is normally flammable. In each case, the resulting composition was classified as self-extinguishing. Extent of burning was as follows:

Poly(methylmethacrylate) _____ inches __ 0.67
Polystyrene _____ do ____ 0.63
Low density polyethylene _____ do ____ 0.70

As the data clearly show, the quaternary ammonium compounds used in the invention are very efficient flame retarding agents and do not depend for their efficacy upon the presence of antimony oxide. In most cases the samples containing only the additive and the control containing no additives were visually distinguishable only by close examination. The opacity of the treated sample was virtually the same as that of the control.

The compositions of this invention may also include small amounts of other materials such as fillers, pigments, anti-oxidants and stabilizers for the polymer, or other additives intended to modify the polymer properties for a particular application. The addition of such materials will usually be made in small proportions—say, less than 10% of the weight of the polymer plus the flame retardant.

The proportion of the other materials should, of course, not be so great as to offset the advantages in density, opacity, etc., deriving from the elimination of the chlorinated organic compound—antimony oxide composition and should also not be so great as to decrease the flame retarding efficacy of the ammonium hexafluorophosphate. These additional ingredients, if any, are preferably, but not necessarily, incorporated into the composition at the same time as the flame retardant additive.

Ammonium hexafluorophosphate is prepared according to procedures known in the art. A typical procedure is outlined in the Inorganic Synthesis, Andrieth, vol. 3, pages 111–117 (McGraw-Hill, 1950). Other methods of preparing hexafluorophosphate salts are to be found in Encyclopedia of Chemical Technology, Kirk & Othmer, vol. 6, pages 717–718 (Interscience, 1951).

What I claim and desire to protect by Letters Patent is:

1. A flameproof composition comprising a major amount of a thermoplastic organic polymer selected from the group consisting of poly(methylmethacrylate), polystyrene, polyethylene terephthalate, stereoregular polypropylene, high density polyethylene, and low density polyethylene and a minor amount of a quaternary ammonium compound having the formula

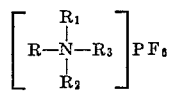

where R, $R_1$, $R_2$, and $R_3$ are selected from the group consisting of alkyl, aryl, alkaryl, and aralkyl radicals and hydrogen, said ammonium compound being present in such amount that the composition contains about 2 to 5% phosphorus based on the total weight of the composition.

2. The composition of claim 1 where the quaternary ammonium compound is ammonium hexafluorophosphate.

3. The composition of claim 1 where the thermoplastic organic polymer is high density polyethylene.

4. The composition of claim 1 where the thermoplastic organic polymer is stereoregular polypropylene.

5. A flameproof composition comprising about 75 to 85% high density polyethylene and about 25 to 15% ammonium hexafluorophosphate, by weight.

6. A flameproof composition comprising about 75 to 85% stereoregular polypropylene and about 25 to 15% ammonium hexafluorophosphate by weight.

7. A flameproof composition comprising about 75 to 85% low density polyethylene and about 25 to 15% ammonium hexafluorophosphate by weight.

8. A flameproof composition comprising about 75 to 85% poly(methylmethacrylate) and about 25 to 15% ammonium hexafluorophosphate by weight.

9. A flameproof composition comprising about 75 to 85% polystyrene and about 25 to 15% ammonium hexafluorophosphate by weight.

References Cited by the Examiner

FOREIGN PATENTS 221,469  5/57  Australia.

OTHER REFERENCES

Woyski, Chem. Abs., 49 (1955), p. 5183d.

JOSEPH L. SCHOFER, *Primary Examiner.*

DONALD E. CZAJA, *Examiner.*

UNITED STATES PATENT OFFICE
CERTIFICATE OF CORRECTION

Patent No. 3,216,968                            November 9, 1965

Stuart B. Monroe

It is hereby certified that error appears in the above numbered patent requiring correction and that the said Letters Patent should read as corrected below.

Column 2, line 36, for "formerly" read -- normally --; column 4, line 10, for "could" read -- would --.

Signed and sealed this 27th day of September 1966.

(SEAL)
Attest:

ERNEST W. SWIDER                           EDWARD J. BRENNER
Attesting Officer                               Commissioner of Patents